US 7,260,400 B2

United States Patent
Chang et al.

(10) Patent No.: US 7,260,400 B2
(45) Date of Patent: Aug. 21, 2007

(54) METHOD AND APPARATUS FOR TRANSMITTING AND RECEIVING CONTROL MESSAGE IN WIRELESS ACCESS COMMUNICATION SYSTEM

(75) Inventors: Sun-Ny Chang, Suwon-si (KR); Yun-Sang Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 150 days.

(21) Appl. No.: 11/005,112

(22) Filed: Dec. 6, 2004

(65) Prior Publication Data

US 2005/0197123 A1   Sep. 8, 2005

(30) Foreign Application Priority Data

Mar. 5, 2004   (KR) .................. 10-2004-0015125
Sep. 6, 2004   (KR) .................. 10-2004-0071021

(51) Int. Cl.
*H04Q 7/20* (2006.01)
*H04Q 7/00* (2006.01)
*H04L 12/28* (2006.01)

(52) U.S. Cl. ................. 455/436; 370/389; 370/392; 370/331

(58) Field of Classification Search ............. 455/436, 455/466, 435.1, 452.2, 439; 370/349, 395.1, 370/470, 472, 474, 477, 338, 389, 392, 331; 357/219
See application file for complete search history.

(56) References Cited

U.S. PATENT DOCUMENTS 6,236,674 B1 * 5/2001 Morelli et al. ............. 375/219
6,597,917 B1 * 7/2003 Meuronen .................. 455/466
6,765,896 B1 * 7/2004 Ahmed et al. ............. 370/338
6,957,071 B1 * 10/2005 Holur et al. ............. 455/452.2
2002/0027919 A1 * 3/2002 Eneroth et al. .......... 370/395.1
2002/0097723 A1   7/2002 Tourunen et al.
2002/0122411 A1 * 9/2002 Zimmerman et al. ....... 370/349

OTHER PUBLICATIONS

Chang et al., "Method for Shortening the MOB_TRF_IND Message Through Reducing Size of the CID Field by Replacing It With a Short Basic CID", May 19, 2004.

* cited by examiner

*Primary Examiner*—Joseph Feild
*Assistant Examiner*—Kiet Doan
(74) *Attorney, Agent, or Firm*—The Farrell Law Firm

(57) ABSTRACT

A registration response (REG_RSP) message is generated which includes a type field, a length field, and an integrated CID (Connector Identifier) field. The integrated CID field includes an integrated CID inserted thereinto. The integrated CID is configured by using a new CID assigned to the subscriber terminal and an old CID assigned to the subscriber terminal by a current serving base station. The type and length fields include type information and length information of the integrated CID respectively inserted thereinto. The generated REG_RSP message is transmitted to a handover target subscriber terminal. A traffic indicator (TRF_IND) message is generated which includes at least one short BCID (Basic Connector Identifier) field into which a short BCID is inserted. The short BCID is configured by a preset number of bits among a total of bits representing a BCID of a positive subscriber terminal that must receive traffic indication information. The generated TRF_IND is then broadcast.

41 Claims, 13 Drawing Sheets

METHOD AND APPARATUS FOR TRANSMITTING AND RECEIVING CONTROL MESSAGE IN WIRELESS ACCESS COMMUNICATION SYSTEM

PRIORITY

This application claims priority to two applications entitled "METHOD AND APPARATUS FOR TRANSMITTING AND RECEIVING CONTROL MESSAGE IN WIRELESS ACCESS COMMUNICATION SYSTEM", filed in the Korean Intellectual Property Office on Mar. 5, 2004 and Sep. 6, 2004 and assigned Serial Nos. 2004-15125 and 2004-71021, respectively, the contents of which are incorporated herein by reference.

BACKGROUND OF THE INVENTION

1. Field of the Invention

The present invention relates to a wireless access communication system, and more particularly to a method and apparatus for transmitting a control message from a base station to a terminal.

2. Description of the Related Art

When the quality of a signal received by a terminal from a BS (Base Station) currently providing service (hereinafter, referred to as "current serving BS") is degraded in a wireless access communication system, a handover is performed so that the terminal receives a better quality of service from an adjacent BS (hereinafter, referred to as "new serving BS"). In this case, the terminal must replace various types of CIDs (Connector Identifiers) assigned from the current serving BS with CIDs (hereinafter, referred to as "new CIDs") to be used in the new serving BS according to the IEEE (Institute of Electrical and Electronics Engineers) 802.16e standard. For example, the CIDs to be replaced can include a basic CID, primary management CID, secondary management CID and transport CID.

When a handover session is initiated, the new serving BS assigns, to a handover target terminal, new CIDs to be used within the new serving BS. Moreover, the new serving BS receives, from the current serving BS, information of CIDs (hereinafter, referred to as "old CIDs") used by the terminal. Subsequently, the new serving BS maps the new CIDs to the old CIDs and transmits a result of the mapping to the terminal. Such information transmitted to the terminal is referred to as CID update information. Conventionally, the new serving BS includes the update information in a registration response message (hereinafter, referred to as "REG_RSP message") serving as one of control messages in the form of TLV (Type-Length-Value) parameters, and transmits the REG_RSP message to the terminal.

FIG. 1 shows the format of a part of the REG_RSP message for transferring conventional CID update information, and, as an example, shows the format of a part used for transferring update information of one CID in the REG_RSP message according to the IEEE 802.16e standard. The REG_RSP message for transferring the CID update information includes an 8-byte CID update information field 10 into which the update information of one CID is inserted; and a variable-length connection information field 12 into which connection information corresponding to the CID update information inserted into the CID update information field 10 is inserted. The CID update information field 10 includes a 1-byte type field 14 into which type information of a new CID is inserted; a 1-byte length field 16 into which length information of the new CID is inserted; a 2-byte new CID field 18 into which a value of the new CID is inserted; a 1-byte type field 20 into which type information of an old CID is inserted; a 1-byte length field 22 into which length information of the old CID is inserted; and a 2-byte old CID field 24 into which a value of the old CID is inserted.

One terminal uses a plurality of CIDs. Whenever the number of CIDs is increased by one, the CID update information field 10 and the connection information field 12 associated therewith are added, one by one, in the REG_RSP message for transferring the CID update information. For example, assuming that the average number of CIDs used by one terminal is 16, 16 CID update information fields 10 are required to transfer the CID update information through the REG_RSP message whenever a handover is performed. Thus, a data field of 128 bytes (=8 bytes×16) is required for the CID update information fields.

To reduce power consumption of the terminal, the wireless access communication system uses a sleep mode indicating a standby state of the terminal as opposed to an active mode indicating a state in which the terminal is in use. That is, to reduce power consumption, the terminal is controlled so that it operates in the sleep mode when in the standby state.

When data to be transmitted to a terminal operating in the sleep mode is present, the BS transmits traffic indication information to a corresponding terminal using a traffic indicator message (hereinafter, referred to as "TRF_IND" message) that is one of control messages, thereby controlling the corresponding terminal so that it operates in the active mode.

Therefore, the BS includes, in the TRF_IND message, a BCID (Basic CID) of the terminal associated with data to be transmitted by the BS among terminals operating in the sleep mode, and broadcasts the TRF_IND message. While a predetermined sleep interval and a predetermined listening interval repeat, the terminal operating in the sleep mode wakes up for some time in the listening interval and then confirms the TRF_IND message broadcast from the BS. That is, the terminal determines whether or not its own BCID has been included in the TRF_IND) message received from the BS. If so, the corresponding terminal wakes up from the sleep mode and then is switched to the active mode.

FIG. 2 shows the format of the conventional TRF_IND message, and more particularly shows the format of the TRF_IND message based on the IEEE 802.16e standard. The conventional TRF_IND message includes an 8-bit management message type field 30 into which management message type information is inserted; an 8-bit field 32 into which information indicating the number of positive subscriber terminals is inserted; and 16-bit BCID fields 34 to 36 into which a BCID of at least one positive subscriber terminal is inserted. The management message type information indicates a type of message to be currently transmitted. When the management message type information is "47" according to the IEEE 802.16e standard, a corresponding message is the TRF_IND message. The positive subscriber terminal indicates a terminal to which the BS transmits data. Each BCID includes a BCID value of each positive subscriber terminal.

As described above, the TRF_IND message includes information indicating the number of positive subscriber terminals, and a number of BCIDs that equal the number of positive subscriber terminals. For example, when the number of positive subscriber terminals is 6, the TRF_IND message includes 6 BCIDs. In this case, a data field of 96 bits (=16 bits×6) is required to identify the positive subscriber terminals.

SUMMARY OF THE INVENTION

It is a feature of the present invention to increase the efficiency of control message transmission in a wireless access communication system by simplifying the format of a registration response (REG_RSP) message for transferring CID (Connector Identifier) update information and reducing the length of the REG_RSP message.

It is another feature of the present invention to increase the efficiency of control message transmission in a wireless access communication system by reducing the length of a traffic indicator (TRF_IND) message for transferring traffic indication information.

In accordance with an embodiment of the present invention, a base station transmits a registration response (REG_RSP) message to a handover target subscriber terminal. The REG_RSP message comprises a type field, a length field, and an integrated CID field. The integrated CID field comprises an integrated CID inserted thereinto. The integrated CID is configured using a new CID assigned to the subscriber terminal and an old CID assigned to the subscriber terminal by a current serving base station. The type and length fields include type information and length information of the integrated CID respectively inserted thereinto.

In accordance with another embodiment of the present invention, a base station transmits a traffic indicator (TRF_IND) message to a subscriber terminal. The TRF_IND message includes at least one short BCID (Basic Connector Identifier) field into which a short BCID is inserted. The short BCID is configured by a preset number of bits among a total of bits representing a BCID of a positive subscriber terminal that must receive the traffic indication information. The TRF_IND message further includes a field into which information indicating the number of bits of the short BCID is inserted. The number of bits of the short BCID represents the length of the short BCID In accordance with another embodiment of the present invention, a subscriber terminal receives a traffic indicator (TRF_IND) message includes at least one short BCID (Basic Connector Identifier) field into which a short BCID is inserted. The short BCID is configured by a preset number of bits among a total of bits representing a BCID of a positive subscriber terminal that must receive the traffic indication information. The subscriber terminal extracts the short BCID from the TRF_IND message, and extracts a short BCID configured by the preset number of bits from the subscriber terminal's own BCID. The subscriber terminal compares the short BCID extracted from the TRF_IND message with the short BCID extracted from the subscriber terminal's own BCID and determines whether or not the subscriber terminal is the positive subscriber terminal.

In accordance with another embodiment of the present invention, a subscriber terminal receives a traffic indicator (TRF_IND) message including at least one short BCID (Basic Connector Identifier) field into which a short BCID is inserted and a field into which information indicating the number of bits of the short BCID is inserted. The short BCID is configured by a preset number of bits among a total of bits representing a BCID of a positive subscriber terminal that must receive the traffic indication information. The number of bits of the short BCID represents the length of the short BCID. The subscriber terminal identifies the information indicating the number of bits of the short BCID from the TRF_IND message, extracts the short BCID from the TRF_IND message according to the identified information, and extracts a short BCID configured by a number of bits based on the identified information from the subscriber terminal's own BCID. The subscriber terminal compares the short BCID extracted from the TRF_IND message with the short BCID extracted from the subscriber terminal's own BCID and determines whether or not the subscriber terminal is the positive subscriber terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may obscure the subject matter of the present invention. Now, a registration response (REG_RSP) message for transferring CID (Connector Identifier) update information and a traffic indicator (TRF_IND) message for transmitting traffic indication information will be described, respectively.

REG RSP Message for Transferring CID Update Information

First, one embodiment of an REG_RSP message for transferring CID update information will be described in accordance with the present invention.

Figure 1:
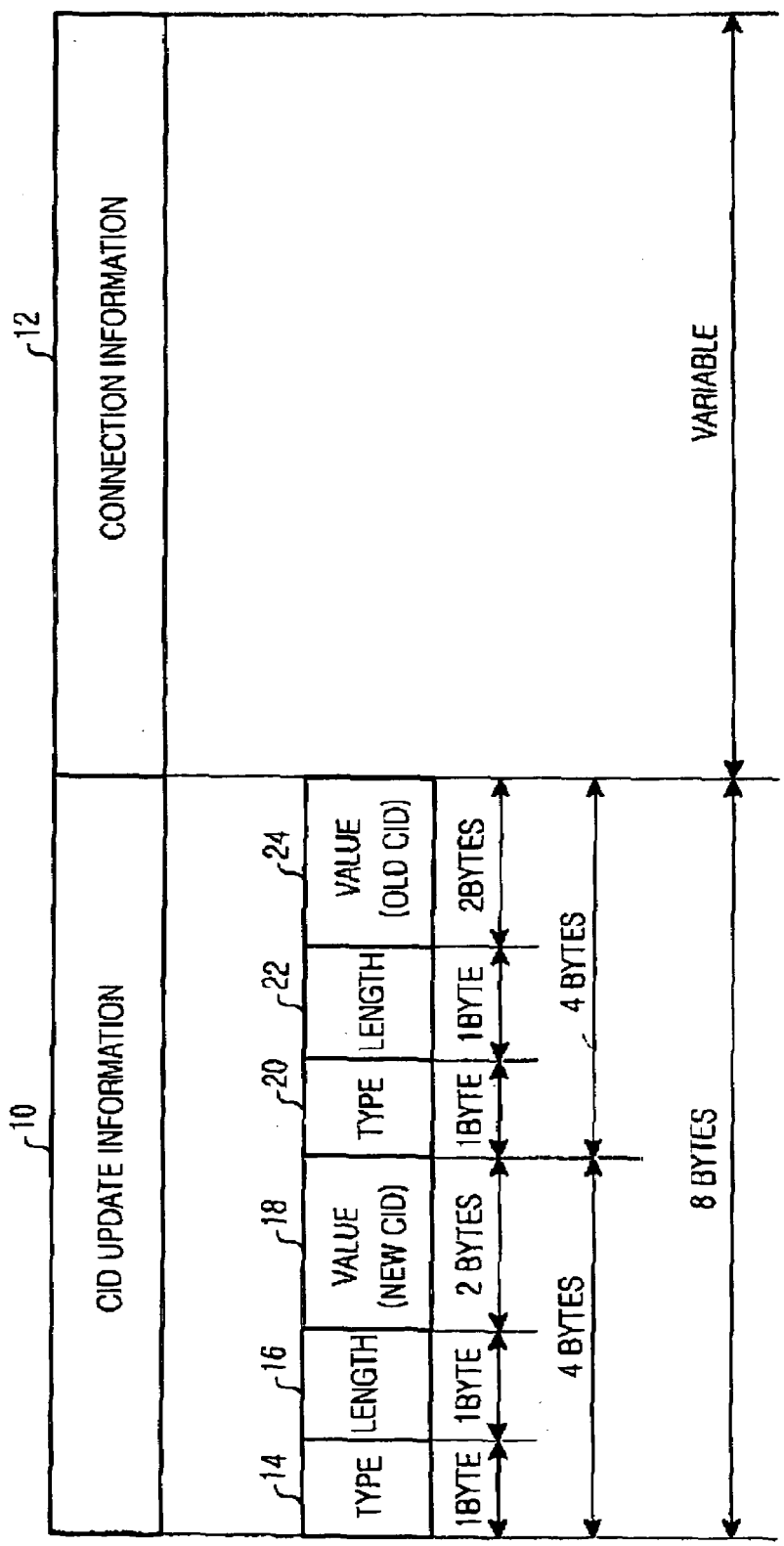
FIG. 1 shows the format of a part of a conventional registration response (REG_RSP) message for transferring CID (Connector Identifier) update information.
Figure 3:
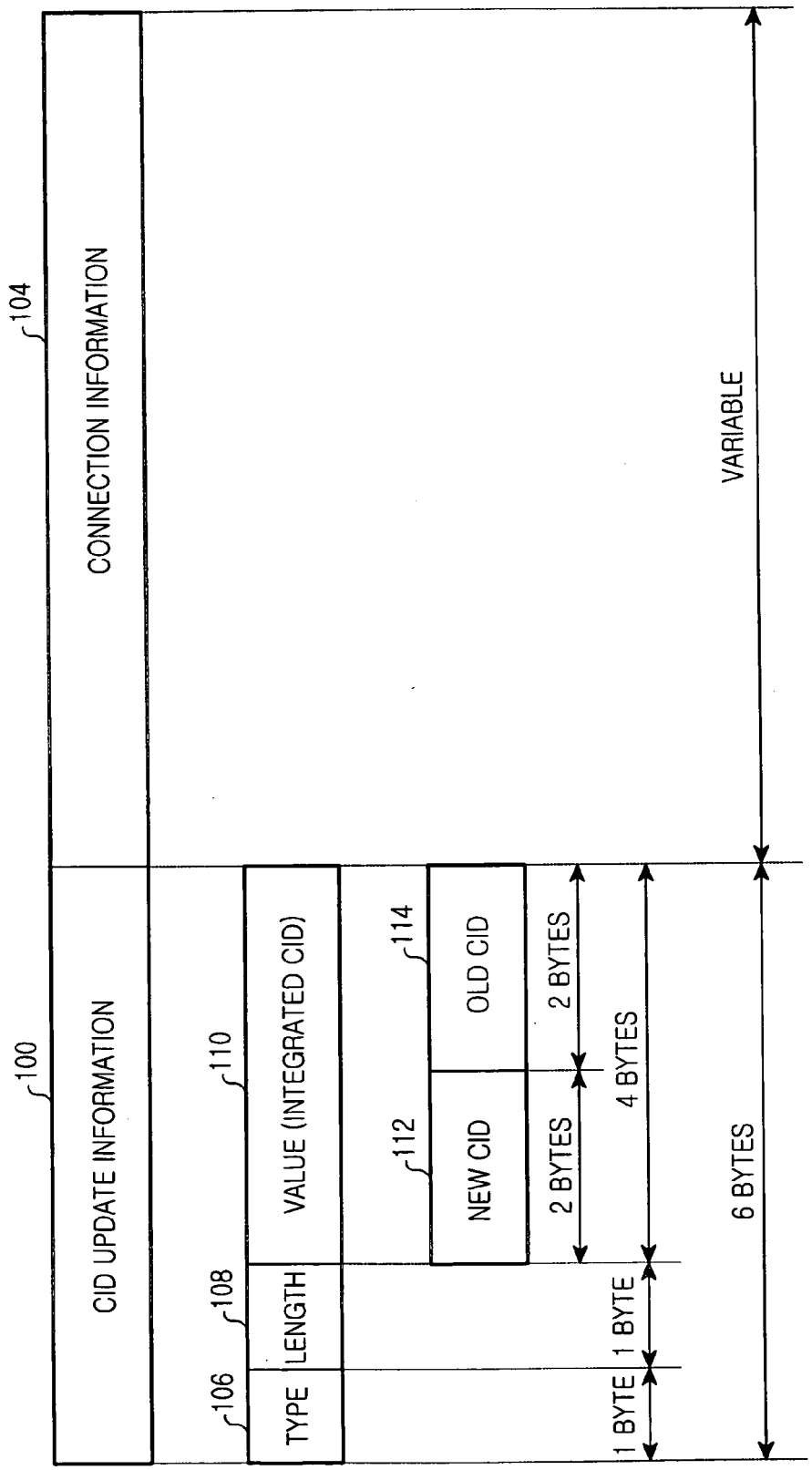
FIG. 3 shows one embodiment of the format of a part of a registration response (REG_RSP) message for transferring CID (Connector Identifier) update information in accordance with the present invention.

FIG. 3 shows an embodiment of the format of the REG_RSP message for transferring CID update information in accordance with the present invention. Like FIG. 1, FIG. 3 also shows the format of a part used for transferring update information of one CID in the REG_RSP message. However, the REG_RSP message shown in FIG. 3 in accordance with the present invention is different from the conventional REG_RSP message which is shown in FIG. 1. That is, the REG_RSP message shown in FIG. 3 includes a 6-byte CID update information field 100 into which update information of one CID is inserted; and a variable-length connection information field 104 into which connection information is inserted. The CID update information field 100 includes a 1-byte type field 106 into which type information of an integrated CID is inserted; a 1-byte length field 108 into which length information of the integrated CID is inserted; and a 4-byte integrated CID field 110 into which a value of the integrated CID is inserted.

The integrated CID field 110 includes a new and old CIDs, and is divided into a 2-byte higher field and a 2-byte lower field. The higher field is used as a new CID field 112 into which the new CID is inserted, and the lower field is used as an old CID field 114 into which the old CID is inserted. Alternatively, the higher field can be used as the old CID field and the lower field can be used as the new CID field.

The CID update information field 10 of the conventional REG-RSP message requires the 1-byte type and length fields 14 and 16 associated with the new CID and the 1-byte type and length fields 20 and 22 associated with the old CID as shown in FIG. 1. However, the CID update information field 100 of the REG-RSP message in accordance with the present invention only includes a 1-byte type field 106 and a 1-byte length field 108 associated with an integrated CID into which the new and old CIDs are integrated. As a result, the prior art requires a 4-byte data field to indicate a type and length associated with the CID update information, while the present invention requires only a 2-byte data field to indicate a type and length associated with the CID update information.

The present invention can deduct 2 bytes per CID from the length of the REG_RSP message, transferring the CID update information, transmitted from a BS (Base Station) to a handover target terminal when a handover is performed, as compared with the prior art. For example, when it is assumed that the handover target terminal uses 16 CIDs, a transmission amount of data of 32 bytes (=2 bytes×16) can be reduced in transmitting the REG_RSP message for transferring the CID update information when the message format in accordance with the present invention is used. Consequently, the efficiency of message transmission can be increased in the wireless access communication system.

FIG. 3 illustrates an example in which the integrated CID field 110 includes only the new CID field 112 and the old CID field 114. However, any one of the type and length fields 106 and 108 divided into fields associated with the new and old CIDs can be included in the integrated CID field 110. For example, the integrated CID field 110 can be configured by extending the integrated CID field 110 by 2 bytes in place of removing the length field 108, adding a 1-byte length field associated with the new CID before the new CID field 112, and adding a 1-byte length field associated with the old CID before the old CID field 114. Otherwise, the integrated CID field 110 can be configured by extending the integrated CID field 110 by 2 bytes in place of removing the type field 106, adding a 1-byte type field associated with the new CID before the new CID field 112, and adding a 1-byte type field associated with the old CID before the old CID field 114. Consequently, the length of the REG_RSP message for transferring CID update information using these alternative embodiments, is reduced by at least one byte per CID, as compared with the length of the conventional REG_RSP message. Moreover, the present invention also reduces the amount of data transmission in transmitting the REG_RSP message for transferring the CID update information, as compared with the prior art.

Figure 4:
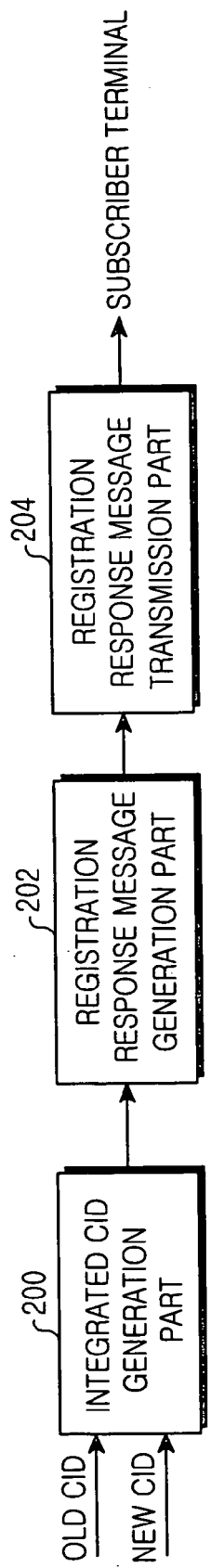
FIG. 4 is a block diagram illustrating one embodiment of an apparatus for transmitting the REG_RSP message transferring the CID update information in accordance with the present invention.

FIG. 4 is a block diagram illustrating one embodiment of an apparatus for transmitting the REG_RSP message transferring the CID update information in accordance with the present invention. The apparatus for transmitting the REG_RSP message includes an integrated CID generation part 200, an REG_RSP message generation part 202, and an REG_RSP message transmission part 204. For example, the integrated CID generation part 200 and the REG_RSP message generation part 202 can be programmed so that a controller for generating the REG_RSP message and transmitting the generated REG_RSP message to a subscriber terminal performs a process according to the flow chart shown in FIG. 5 in a BS (Base Station) of the wireless access communication system to which the present invention is applied.

Figure 5:
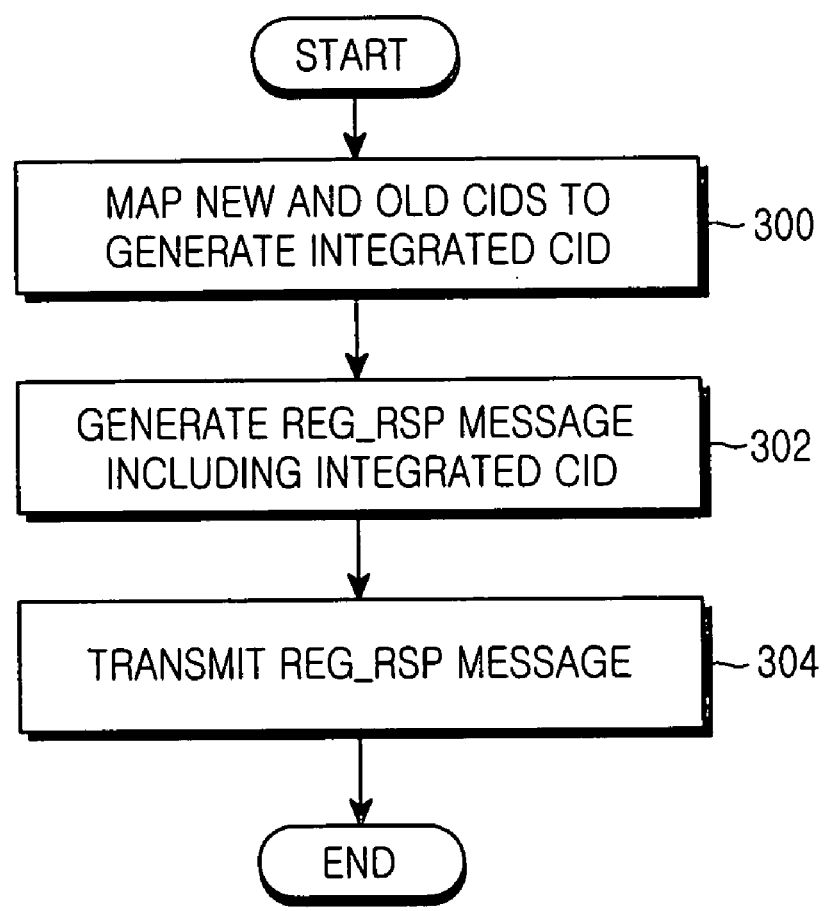
FIG. 5 is a flow chart illustrating one embodiment of a method for processing and transmitting the REG_RSP message transferring the CID update information in accordance with the present invention.

Referring to FIGS. 4 and 5, when the REG_RSP message for transferring CID update information must be transmitted to a handover target subscriber terminal, the integrated CID generation part 200 integrates old and new CIDs to generate an integrated CID and provides the generated integrated CID to the REG_RSP message generation part 202 at step 300 shown in FIG. 5. Then, the REG_RSP message generation part 202 generates an REG_RSP message including the integrated CID as shown in FIG. 3 at step 302 and the REG_RSP message transmission part 204 transmits the generated REG_RSP message to the handover target subscriber terminal at step 304. The handover target subscriber terminal receives the transmitted REG_RSP message, confirms type and length associated with the integrated CID from the type and length fields 106 and 108 defined as shown in FIG. 3, and confirms the new and old CIDs present in the integrated CID field.

TRF IND Message for Transferring Traffic Indication Information

Now, an embodiment of a TRF_IND message for transferring traffic indication information will be described in accordance with the present invention.

First, characteristics of a BCID (Basic Connector Identifier) indicating each of the subscriber terminals in the TRF_IND message will be described. According to the IEEE 802.16e standard, a BS (Base Station) has "m" BCIDs of Nos. 0x0001 to m. Here, m indicates the total number of terminals capable of being supported by the BS, and can be differently set between BSs. Typically, m is set to a value between 100 and 200. If m is 200, a corresponding BS can differentiate between subscriber terminals using only the 8 least significant bits of 16 bits in each of the BCIDs. That is, because $2^8=256$, the BS can therefore differentiate between 200 subscriber terminals using the 8 least significant bits of a BCID value and not have to use all 16 bits of a BCID value. Thus, when the 8 least significant bits rather than all 16 bits of the BCID are included in the TRF_IND message, the BS can differentiate between the subscriber terminals and the length of the TRF_IND message can be reduced by 8 bits per positive subscriber terminal included in the TRF_IND message, such that the effect of reducing the amount of data transmission can be obtained. In another example, if m is 100, a corresponding BS can differentiate between the subscriber terminals using only 7 least significant bits of the 16 bits in each of the BCIDs. That is, because $2^7=128$, the BS can therefore differentiate between 100 subscriber terminals using only the 7 least significant bits BCID value. Thus, when the 7 least significant bits rather than all 16 bits of the BCID are included in the TRF_IND message, the BS can differentiate between the subscriber terminals and the length of the TRF_IND message can be reduced by 9 bits per positive subscriber terminal included in the TRF_IND message, such that the effect of reducing an amount of data transmission can be obtained. Consequently, the efficiency of control message transmission can be increased in transmitting the TRF_IND message in the wireless access communication system.

A BCID configured by only a predetermined number of bits smaller than the 16 bits in place of the existing 16-bit BCID is referred to as a "short BCID" in this specification. In accordance with the present invention, the short BCID includes the exact minimum number of bits necessary for identifying each terminal. Preferably, the short BCID can be configured by a predetermined number of least significant bits among the 16 bits of the BCID.

The BSs use different m values, but a corresponding BS can differentiate between all subscriber terminals actually receiving service from the BS without using all the 16 bits of the BCID. When this is taken into account, the number of bits of the short BCID can be fixedly set to any number between 7 and 15 bits, for example, 12 bits, in the BSs of the wireless access communication system of the present invention. Because the number of BCID bits available in each BS can be different according to the m value used in each BS, it will be able to be variably set. That is, the number of bits of the short BCID can be variably preset on the basis of the total number of subscriber terminals capable of receiving service from each BS. Also when the number of bits of the short BCID is variable (i.e., not being a fixed number of bits), it is preferred that information indicating the number of bits of the short BCID is included in the TRF_IND message so that the subscriber terminal receiving the TRF_IND message can recognize the number of bits of the short BCID included in the received TRF_IND message.

Figure 2:
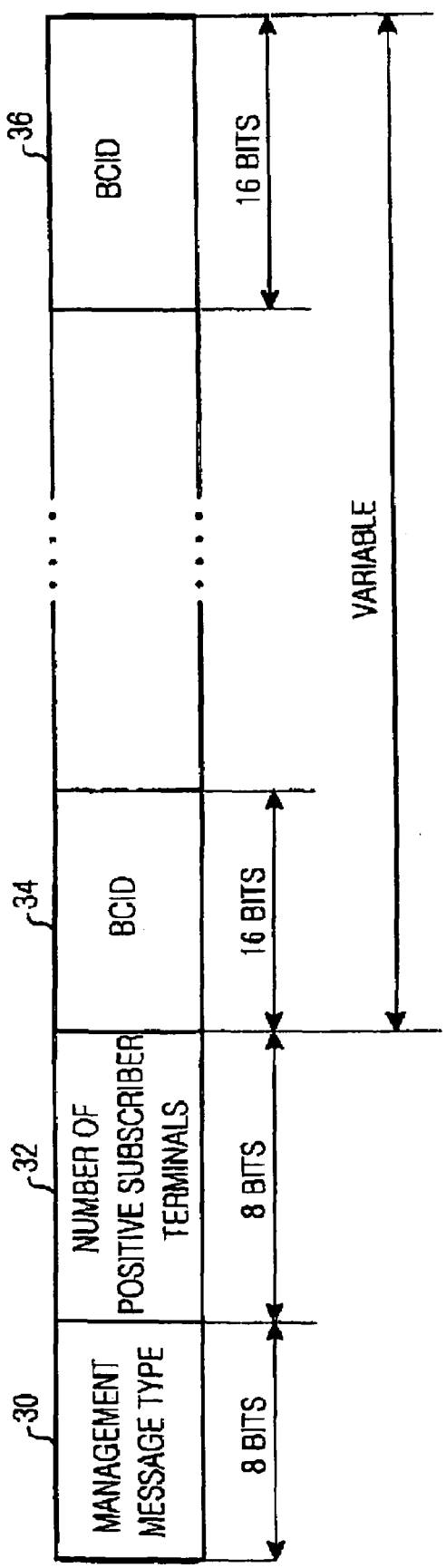
FIG. 2 shows the format of a conventional traffic indicator (TRF_IND) message.
Figure 6:
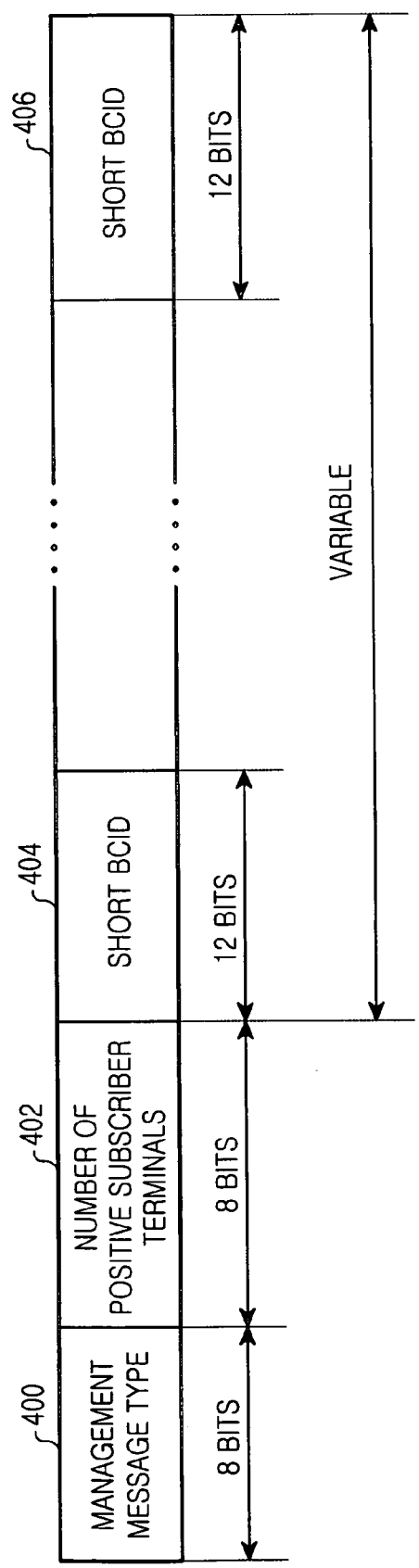
FIG. 6 shows one embodiment of the format of a traffic indicator (TRF_IND) message in accordance with the present invention.

FIG. 6 shows one embodiment of the format of the TRF_IND message in accordance with an embodiment of the present invention, and shows an example of fixedly setting the number of bits of the short BCID. The TRF_IND message includes an 8-bit management message type field 400 into which management message type information is inserted; and an 8-bit field 402 into which information indicating the number of positive subscriber terminals is inserted, as in FIG. 2. However, the TRF_IND message shown in FIG. 6 includes one or more 12-bit short BCID fields 404 to 406 corresponding to the number of positive subscriber terminals in place of the 16-bit BCID fields 34 to 36 into which 16-bit BCIDs of positive subscriber terminals are inserted as shown in FIG. 2. The TRF_IND message shown in FIG. 6 shows an example of fixedly setting the number of bits of the short BCID to 12 bits. The number of bits of the short BCID can be fixedly set to any number between 7 and 15.

Figure 7:
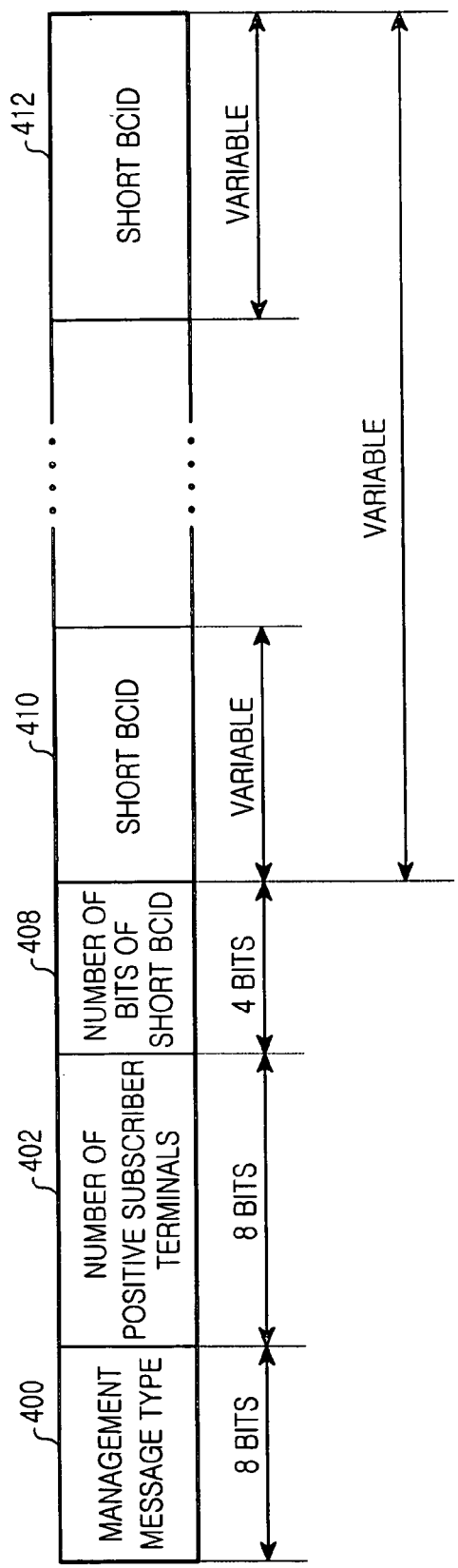
FIG. 7 illustrates an embodiment of the format of a TRF_IND message in accordance with the present invention.

FIG. 7 shows another embodiment of the format of the TRF_IND message in accordance with the present invention, and shows an example of variably setting the number of bits of a short BCID in each BS. The TRF_IND message includes an 8-bit management message type field 400 into which management message type information is inserted; and an 8-bit field 402 into which information indicating the number of positive subscriber terminals is inserted. Because the TRF_IND message shown in FIG. 7 indicates the case where the number of bits of the short BCID is variable, it further includes a 4-bit field 408 indicating the number of bits of the short BCID and is positioned after the field 402 indicating the number of positive subscriber terminals. Short BCID fields 410 to 412 follow the field 408. Short BCIDs with the number of bits variably set in each BS are inserted into the short BCID fields 410 to 412. The number of bits of the short BCID is indicated by information inserted into the field 408.

When the TRF_IND message with the format shown in FIG. 7 is used, a field indicating the number of bits of the short BCID is added. Thus, when the number of bits of the short BCID is 12 bits, the length of the TRF_IND message is increased by 4 bits, as compared with that of the TRF_IND message shown in FIG. 6. However, the number of bits of the short BCID can be typically reduced by up to 7 bits according to a BS, such that the length of the TRF_IND message can be further shortened.

Figure 8:
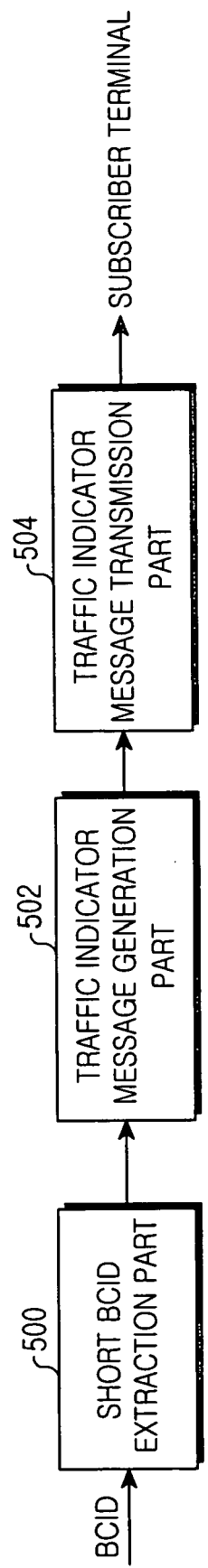
FIG. 8 is a block diagram illustrating one embodiment of an apparatus for transmitting the TRF_IND message in accordance with the present invention.

FIG. 8 is a block diagram illustrating one embodiment of an apparatus for transmitting the TRF_IND message transferring the traffic indication information in accordance with the present invention. The apparatus for transmitting the TRF_IND message is includes a short BCID extraction part 500, a TRF_IND message generation part 502, and a TRF_IND message transmission part 504. For example, the short BCID extraction part 500 and the TRF_IND message generation part 502 can be programmed so that a controller for generating the TRF_IND message and transmitting the generated TRF_IND message to a subscriber terminal performs a process according to the flow chart shown in FIG. 9, in a BS (Base Station) of the wireless access communication system to which the present invention is applied.

Figure 9:
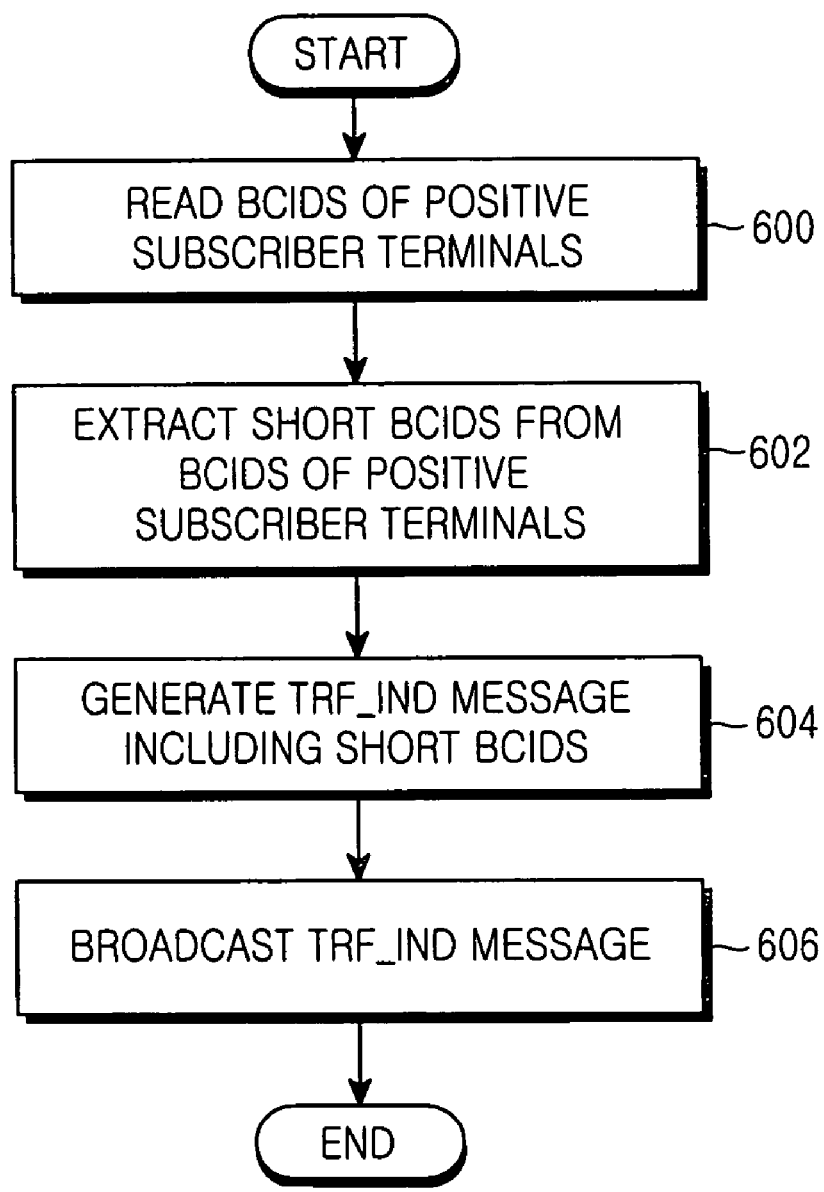
FIG. 9 is a flow chart illustrating one embodiment of a method for processing and transmitting the TRF_IND message in accordance with the present invention.

Referring to FIGS. 8 and 9, when the TRF_IND message for transferring traffic indication information must be transmitted to one or more handover target subscriber terminals, the short BCID extraction part 500 extracts short BCIDs by reading BCIDs of the positive subscriber terminals and provides the extracted short BCIDs to the TRF_IND message generation part 502 at steps 600 and 602 shown in FIG. 9. At this point, the short BCID extraction part 500 extracts the short BCIDs that are respectively configured by the fixed number of least significant bits when the number of bits of the short BCID is fixedly set as shown in FIG. 6, or extracts the short BCIDs that are respectively configured by the variable number of least significant bits when the number of bits of the short BCID is variably set as shown in FIG. 7.

Subsequently, the TRF_IND message generation part 502 generates the TRF_IND message including a short BCID at step 604 as in FIG. 6 or 7, and the TRF_IND message transmission part 504 broadcasts the generated TRF_IND message at step 606.

Figure 10:
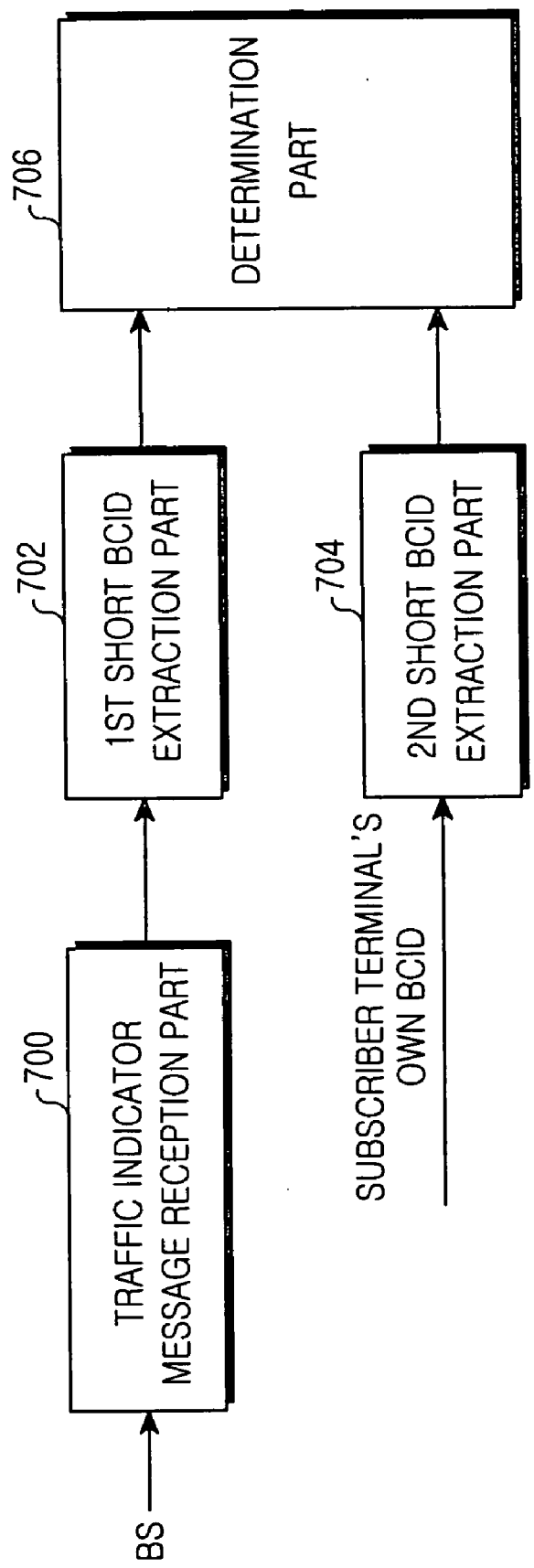
FIG. 10 is a block diagram illustrating one embodiment of an apparatus for receiving the TRF_IND message in accordance with the present invention.

FIG. 10 is a block diagram illustrating one embodiment of an apparatus for receiving the TRF_IND message in accordance with the present invention. The apparatus for receiving the TRF_IND message includes a TRF_IND message reception part 700, a first short BCID extraction part 702, a second short BCID extraction part 704, and a determination part 706. FIG. 10 shows an example in which the apparatus for receiving the TRF_IND message is applied to the subscriber terminal when the wireless access communication system uses the TRF_IND message shown in FIG. 6. For example, the first and second short BCID extraction parts 702 and 704 and the determination part 706 can be programmed so that a controller for receiving and processing the TRF_IND message performs a process according to the flow chart shown in FIG. 11 in the subscriber terminal of the wireless access communication system to which the present invention is applied.

Figure 11:
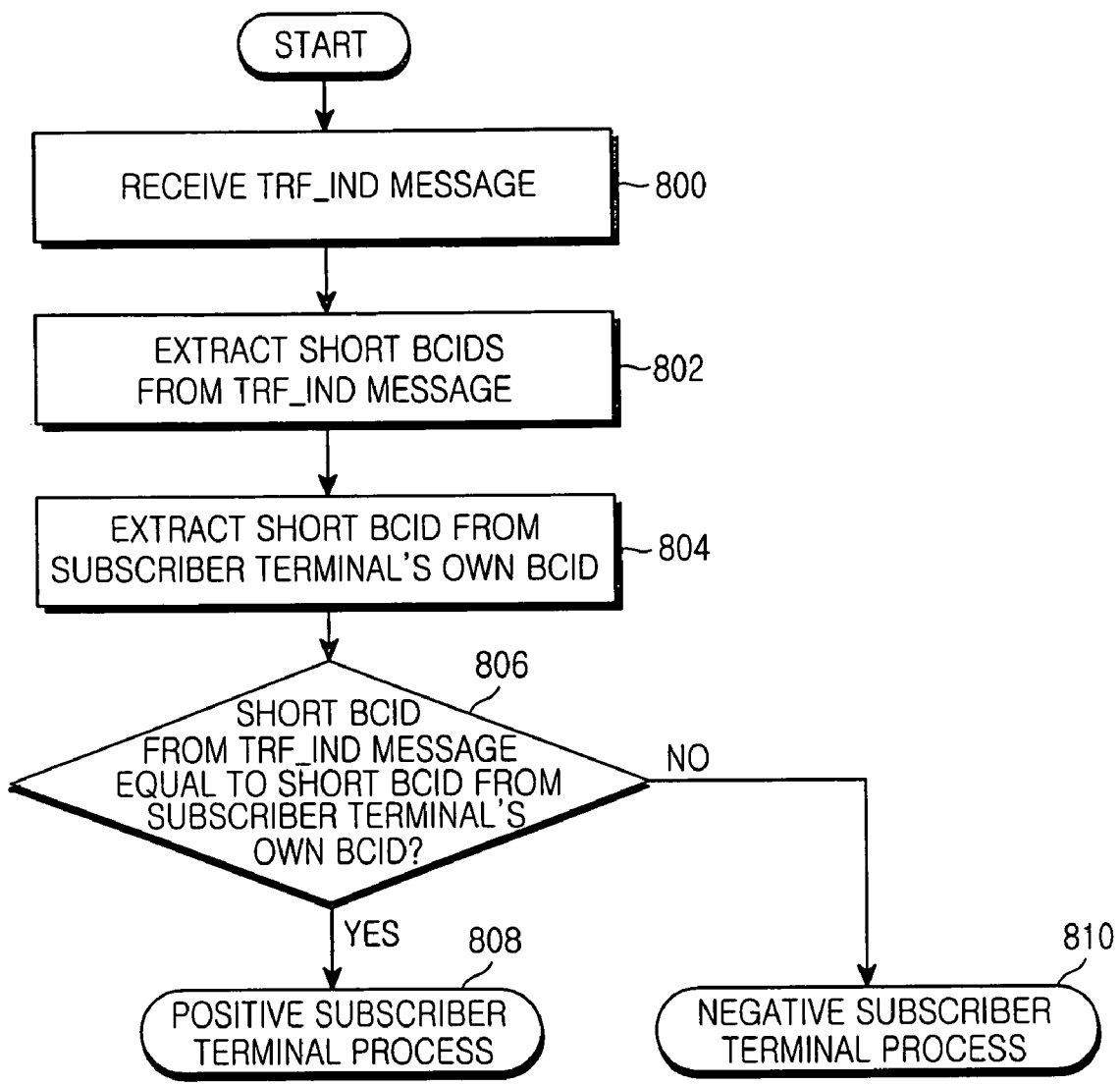
FIG. 11 is a flow chart illustrating one embodiment of a method for receiving and processing the TRF_IND message in accordance with the present invention.

Referring to FIGS. 10 and 11, when the terminal receives the TRF_IND message broadcast from the BS by means of the TRF_IND message reception part 700 at step 800 shown in FIG. 11, the first short BCID extraction part 702 extracts one or more short BCIDs, that is, short BCIDs present in the short BCID fields 404 to 406 in the example of FIG. 6, from the TRF_IND message at step 802. Then, the second short BCID extraction part 704 extracts only the fixedly set number of least significant bits serving as a short BCID from among bits included in the subscriber terminal's own BCID at step 804.

Subsequently, at step 806, the determination part 706 compares the short BCIDs extracted from the TRF_IND message by the first short BCID extraction part 702 with the short BCID extracted from the subscriber terminal's own BCID by the second short BCID extraction part 704, and then determines whether or not the subscriber terminal is a positive subscriber terminal. At this point, the determination part 706 determines whether or not the short BCID extracted from the subscriber terminal's own BCID equals one of the BCIDs extracted from the TRF_IND message. If the short BCID extracted from the subscriber terminal's own BCID equals one of the BCIDs extracted from the TRF_IND message, the subscriber terminal is determined to be a positive subscriber terminal. Then, a process based on the positive subscriber terminal is performed at step 808. That is, the subscriber terminal awakens from a sleep mode and then is switched to an active mode as in a conventional case. On the other hand, if the short BCID extracted from the subscriber terminal's own BCID is different from any one of the BCIDs extracted from the TRF_IND message, the subscriber terminal is determined to be a negative subscriber terminal. Then, a process based on the negative subscriber terminal, that is, the sleep mode, is continued at step 810.

Figure 12:
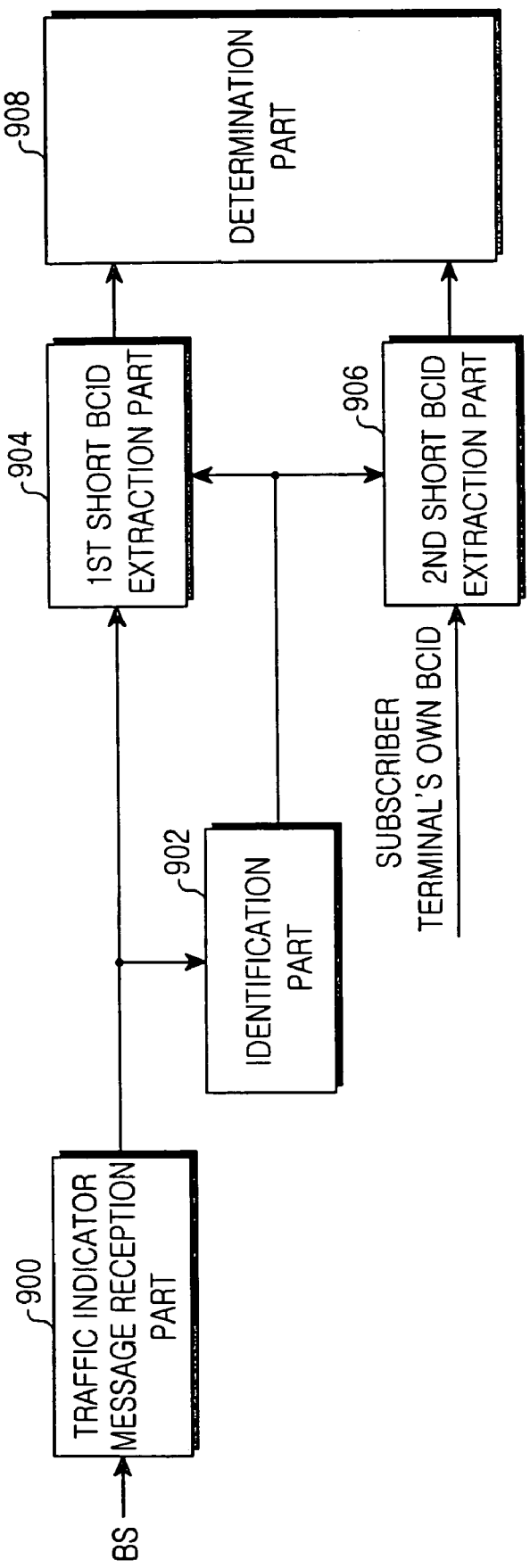
FIG. 12 is a block diagram illustrating another embodiment of an apparatus for receiving the TRF_IND message in accordance with the present invention.

FIG. 12 is a block diagram illustrating another embodiment of an apparatus for receiving the TRF_IND message in accordance with the present invention. The apparatus for receiving the TRF_IND message includes a TRF_IND message reception part 900, an identification part 902 for identifying the number of bits of a short BCID, a first short BCID extraction part 904, a second short BCID extraction part 906 and a determination part 908. FIG. 12 shows an example in which the apparatus for receiving the TRF_IND message is applied to the subscriber terminal when the wireless access communication system uses the TRF_IND message shown in FIG. 7. For example, the identification part 902, the first and second short BCID extraction parts 904 and 906, and the determination part 908 can be programmed so that a controller for receiving and processing the TRF_IND message performs a process according to the flow chart shown in FIG. 13 in the subscriber terminal of the wireless access communication system to which the present invention is applied.

Figure 13:
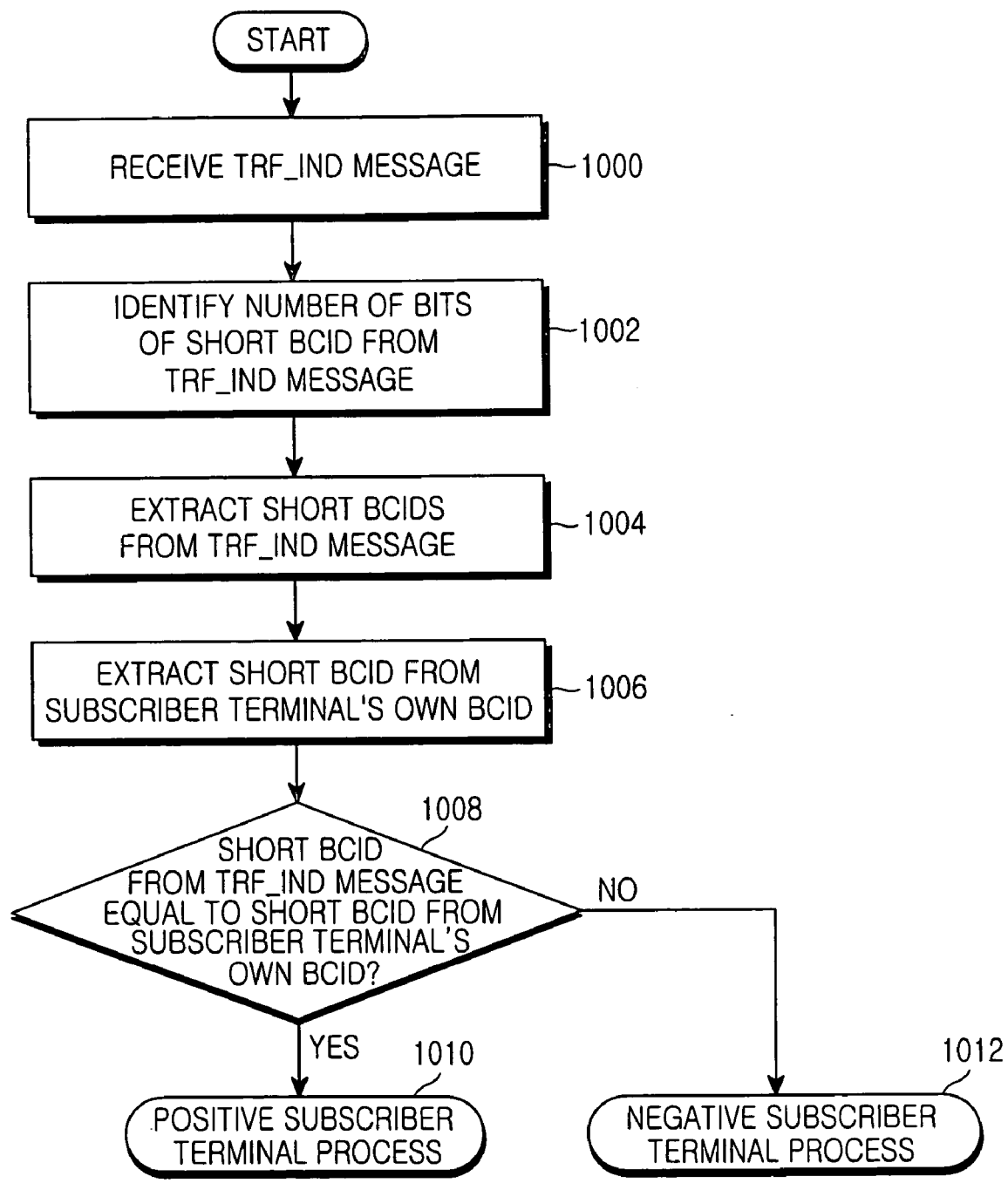
FIG. 13 is a flow chart illustrating another embodiment of a method for receiving and processing the TRF_IND message in accordance with the present invention.

Referring to FIGS. 12 and 13, when the terminal receives the TRF_IND message broadcast from the BS by means of the TRF_IND message reception part 900 at step 1000 shown in FIG. 13, the identification part 902 for identifying the number of bits of a short BCID identifies at least one short BCID based on information indicating the number of bits of a short BCID present in the field 408, that is, the number of bits of each short BCID present in the short BCID fields 410 to 412, in the example shown in FIG. 7, at step 1002. Subsequently, the first short BCID extraction part 904 extracts short BCIDs present in the short BCID fields 410 to 412 shown in FIG. 7 on the basis of the number of bits of each short BCID identified from the TRF_IND message by the identification part 902 at step 1004. Then, at step 1006, the second short BCID extraction part 904 extracts only less significant bits corresponding to the number of bits of the short BCID identified by the identification part 902 from among the bits included in the subscriber terminal's own BCID.

Subsequently, at steps 1008 to 1012 similar to the above steps 806 to 810 shown in FIG. 11, the determination part 908 compares the short BCIDs extracted from the TRF_IND message with the short BCID extracted from the subscriber terminal's own BCID, and then determines whether or not the subscriber terminal is a positive subscriber terminal, such that a corresponding process is performed according to a result of the determination.

As described above, the present invention simplifies the format of a registration response (REG_RSP) message for transferring CID (Connector Identifier) update information and simultaneously reduces the length of the REG_RSP message, and reduces the length of a traffic indicator (TRF_IND) message for transferring traffic indication information. Thus, an amount of data transmission necessary for transferring a control message is reduced, such that the efficiency of transmission in a wireless access communication system can be increased.

Although the preferred embodiments of the present invention have been disclosed for illustrative purposes, those skilled in the art will appreciate that various modifications, additions and substitutions are possible, without departing from the scope of the invention. There has been described an example in which a traffic indicator (TRF_IND) message further includes a field indicating the number of bits of a short BCID (Basic Connector Identifier) when the number of bits of a short BCID is variably set in each BS (Base Station) in accordance with the present invention. As the TRF_IND message further includes the field indicating the number of bits of a short BCID in a wireless access communication system in which the number of bits of the BCID is fixedly set in each BS, a subscriber terminal can be notified of the number of bits of the short BCID. The present invention can also be applied to other types of control message with the format similar to the format of the REG_RSP or TRF_IND message as well as the REG_RSP message for transferring CID update information or the TRF_IND message for transferring traffic indication information. Therefore, the present invention is not limited to the above-described embodiments, but the present invention is defined by the claims that follow, along with their full scope of equivalents.

What is claimed is:

1. A method for transmitting a control message transferring CID (Connector Identifier) update information to a handover target subscriber terminal in a wireless access communication system, comprising:

transmitting a registration response message to the subscriber terminal;
   wherein the registration response message comprises an integrated CID field and at least one of a type field and length field, and wherein the integrated CID field comprises an integrated CID, and the integrated CID field comprises a new CID and an old CID, and wherein when the registration response message comprises the integrated CID field and the type field, the integrated CID field comprises a new CID assigned to the subscriber terminal, length information of the new CID, an old CID assigned to the subscriber terminal, and length information of the old CID, and the type field comprises type information of the integrated CID.

2. The method of claim 1, wherein the integrated CID field is divided into a higher field into which the new CID is inserted and a lower field into which the old CID is inserted.

3. The method of claim 1, wherein the integrated CID field is divided into a higher field into which the old CID is inserted and a lower field into which the new CID is inserted.

4. The apparatus of claim 1, wherein when the registration response message comprises the integrated CID field and the length field, the integrated CID field comprises a new CID assigned to the subscriber terminal, type information of the new CID, an old CID assigned to the subscriber terminal, and type information of the old CID, and the length field comprises length information of the integrated CID.

5. An apparatus for transmitting a control message transferring CID (Connector Identifier) update information to a handover target subscriber terminal in a wireless access communication system, comprising:
a registration response message generation part for generating a registration response message comprising an integrated CID field and at least one of a type field and a length field, and wherein the integrated CID field comprises a new CID and an old CID; and
a registration response message transmission part for transmitting the generated registration response message to the subscriber terminal,
wherein when the registration response message comprises the integrated CID field and the type field, the integrated CID field comprises a new CID assigned to the subscriber terminal, length information of the new CID, an old CID assigned to the subscriber terminal, and length information of the old CID, and the type field comprises type information of the integrated CID.

6. The apparatus of claim 5, wherein the registration response message generation part inserts the new CID into a higher field belonging to the integrated CID field and inserts the old CID into a lower field belonging to the integrated CID field.

7. The apparatus of claim 5, wherein the registration response message generation part inserts the old CID into a higher field belonging to the integrated CID field and inserts the new CID into a lower field belonging to the integrated CID field.

8. A method for transmitting a traffic indicator message comprising traffic indication information to a subscriber terminal in a sleep mode in a wireless access communication system, comprising:
transmitting the traffic indicator message to the subscriber terminal;
wherein the traffic indicator message represents existence of data to be transmitted from the base station to the subscriber station, the traffic indicator message comprising at least one short BCID (Basic Connector Identifier) field into which a short BCID is inserted, and a field into which information indicating the number of bits of the short BCID is inserted, the number of bits of the short BCID representing the length of the short BCID, the short BCID being configured by a given number of bits among a total of bits representing a BCID of a positive subscriber terminal that must receive the traffic indication information.

9. The method of claim 8, wherein the bits of the short BCID are the given number of least significant bits among the total of bits representing the BCID.

10. The method of claim 9, wherein the number of bits of the short BCID is variably preset by each base station according to the total number of subscriber terminals to which a single base station can provide service.

11. The method of claim 10, wherein the traffic indicator message further comprises a field into which information indicating the number of bits of the short BCID is inserted, the number of bits of the short BCID representing the length of the short BCID.

12. The method of claim 9, wherein the number of bits of the short BCID is preset.

13. The method of claim 12, wherein the traffic indicator message further comprises a field into which information indicating the number of bits of the short BCID is inserted, the number of bits of the short BCID representing the length of the short BCID.

14. The method of claim 9, wherein the traffic indicator message further comprises a field into which information indicating the number of bits of the short BCID is inserted, the number of bits of the short BCID representing the length of the short BCID.

15. The method of claim 8, wherein the number of short BCID fields is equal to the number of positive subscriber terminals, and wherein the at least one short BCID field corresponds to one positive subscriber terminal, respectively.

16. The method of claim 15, wherein the number of bits of the short BCID is variably preset by each base station according to the total number of subscriber terminals to which a single base station can provide service.

17. The method of claim 16, wherein the traffic indicator message further comprises a field into which information indicating the number of bits of the short BCID is inserted, the number of bits of the short BCID representing the length of the short BCID.

18. The method of claim 15, wherein the number of bits of the short BCID is preset.

19. The method of claim 18, wherein the traffic indicator message further comprises a field into which information indicating the number of bits of the short BCID is inserted, the number of bits of the short BCID representing the length of the short BCID.

20. The method of claim 15, wherein the traffic indicator message further comprises a field into which information indicating the number of bits of the short BCID is inserted, the number of bits of the short BCID representing the length of the short BCID.

21. The method of claim 8, wherein the number of bits of the short BCID is variably preset by each base station according to the total number of subscriber terminals to which a single base station can provide service.

22. The method of claim 21, wherein the traffic indicator message further comprises a field into which information indicating the number of bits of the short BCID is inserted, the number of bits of the short BCID representing the length of the short BCID.

23. The method of claim 8, wherein the number of bits of the short BCID is preset.

24. The method of claim 23, wherein the traffic indicator message further comprises a field into which information indicating the number of bits of the short BCID is inserted, the number of bits of the short BCID representing the length of the short BCID.

25. An apparatus for transmitting a traffic indicator message comprising traffic indication information to a subscriber terminal in a sleep mode in a wireless access communication system, comprising:
- a short BCID (Basic Connector Identifier) extraction part for extracting a preset number of bits serving as a short BCID from among a total of bits representing a BCID of a positive subscriber terminal that must receive the traffic indication information;
- a traffic indicator message generation part for generating a traffic indicator message comprising at least one short BCID (Basic Connector Identifier) field into which the short BCID is inserted, and a field into which information indicating the number of bits of the short BCID is inserted, the number of bits of the short BCID representing the length of the short BCID; and
- a traffic indicator message transmission part for transmitting the generated traffic indicator message to the subscriber terminal,
- wherein the traffic indicator message represents if data exits to be transmitted from a base station to the subscriber station.

26. The apparatus of claim 25, wherein the bits of the short BCID are the preset number of least significant bits from among the total of bits representing the BCID.

27. The apparatus of claim 26, wherein the number of bits of the short BCID is variably preset by each base station according to the total number of subscriber terminals to which one base station can provide service.

28. The apparatus of claim 27, wherein the traffic indicator message generation part generates the traffic indicator message further comprising a field into which information indicating the number of bits of the short BCID is inserted, the number of bits of the short BCID representing the length of the short BCID.

29. The apparatus of claim 26, wherein the number of bits of the short BCID is preset.

30. The apparatus of claim 25, wherein the traffic indicator message generation part generates the traffic indicator message so that the number of short BCID fields is equal to the number of positive subscriber terminals and the at least one short BCID field corresponds to one positive subscriber terminal, respectively.

31. The apparatus of claim 30, wherein the number of bits of the short BCID is variably preset by each base station according to the total number of subscriber terminals to which one base station can provide service.

32. The apparatus of claim 31, wherein the traffic indicator message generation part generates the traffic indicator message further comprising a field into which information indicating the number of bits of the short BCID is inserted, the number of bits of the short BCID representing the length of the short BCID.

33. The apparatus of claim 30, wherein the number of bits of the short BCID is preset.

34. The apparatus of claim 25, wherein the number of bits of the short BCID is variably preset by each base station according to the total number of subscriber terminals to which one base station can provide service.

35. The apparatus of claim 34, wherein the traffic indicator message generation part generates the traffic indicator message further comprising a field into which information indicating the number of bits of the short BCID is inserted, the number of bits of the short BCID representing the length of the short BCID.

36. The apparatus of claim 25, wherein the number of bits of the short BCID is preset.

37. The apparatus of claim 36, wherein the traffic indicator message generation part generates the traffic indicator message further comprising a field into which information indicating the number of bits of the short BCID is inserted, the number of bits of the short BCID representing the length of the short BCID.

38. A method for receiving a traffic indicator message comprising traffic indication information by means of a subscriber terminal in a sleep mode in a wireless access communication system, comprising:
- receiving the traffic indicator message comprising at least one short BCID (Basic Connector Identifier) field into which a short BCID is inserted, the short BCID being configured by a preset number of bits among a total of bits representing a BCID of a positive subscriber terminal that must receive the traffic indication information, wherein the bits of the short BCID are the preset number of least significant bits from among the total of bits representing the BCID, wherein the traffic indicator message represents if data exists to be transmitted from a base station to the subscriber station;
- extracting the short BCID from the traffic indicator message;
- extracting, from the subscriber terminal's own BCID, a short BCID configured by the preset number of bits; and
- comparing the short BCID extracted from the traffic indicator message with the short BCID extracted from the subscriber terminal's own BCID and determining whether the subscriber terminal is the positive subscriber terminal.

39. A method for receiving a traffic indicator message comprising traffic indication information by means of a subscriber terminal in a sleep mode in a wireless access communication system, comprising:
- receiving the traffic indicator message comprising at least one short BCID (Basic Connector Identifier) field into which a short BCID is inserted and a field into which information indicating the number of bits of the short BCID is inserted, wherein the short BCID is configured by a preset number of bits from among a total of bits representing a BCID of a positive subscriber terminal that must receive the traffic indication information and wherein the number of bits of the short BCID represents the length of the short BCID, wherein the bits of the short BCID are the preset number of least significant bits from among the total of bits representing the BCID, wherein the traffic indicator message represents if data exists to be transmitted from a base station to the subscriber station;
- identifying, from the traffic indicator message, the information indicating the number of bits of the short BCID;
- extracting the short BCID from the traffic indicator message according to the identified information;
- extracting, from the subscriber terminal's own BCID, a short BCID configured by only a number of bits based on the identified information; and
- comparing the short BCID extracted from the traffic indicator message with the short BCID extracted from the subscriber terminal's own BCID and determining whether the subscriber terminal is the positive subscriber terminal.

40. An apparatus for receiving a traffic indicator message comprising traffic indication information by means of a subscriber terminal in a sleep mode in a wireless access communication system, comprising:

a traffic indicator message receiver for receiving a traffic indicator message comprising at least one short BCID (Basic Connector Identifier) field into which a short BCID is inserted, the short BCID being configured by a preset number of bits among a total of bits representing a BCID of a positive subscriber terminal that must receive the traffic indication information, wherein the bits of the short BCID are the present number of least significant bits from among the total of bits representing the BCID, wherein the traffic indicator message represents if data exists to be transmitted from a base station to the subscriber station;

a first short BCID extraction part for extracting the short BCID from the traffic indicator message;

a second short BCID extraction part for extracting, from the subscriber terminal's own BCID, a short BCID configured by the preset number of bits; and a determination part for comparing the short BCID extracted from the traffic indicator message with the short BCID extracted from the subscriber terminal's own BCID and determining whether subscriber terminal is the positive subscriber terminal.

41. An apparatus for receiving a traffic indicator message comprising traffic indication information by means of a subscriber terminal in a sleep mode in a wireless access communication system, comprising:

a traffic indicator message reception part for receiving a traffic indicator message comprising at least one short BCID (Basic Connector Identifier) field into which a short BCID is inserted and a field into which information indicating the number of bits of the short BCID is inserted, wherein the short BCID is configured by a preset number of bits among a total of bits representing a BCID of a positive subscriber terminal that must receive the traffic indication information and wherein the number of bits of the short BCID represents the length of the short BCID, wherein the traffic indicator message represents if data exists to be transmitted from a base station to the subscriber station;

an identification part for identifying, from the traffic indicator message, the information indicating the number of bits of the short BCID; wherein the bits of the short BCID are the preset number of least significant bits from among the total of bits representing the BCID;

a first short BCID extraction part for extracting the short BCID from the traffic indicator message according to the identified information;

a second short BCID extraction part for extracting, from the subscriber terminal's own BCID, a short BCID configured by a number of bits based on the identified information; and a determination part for comparing the short BCID extracted from the traffic indicator message with the short BCID extracted from the subscriber terminal's own BCID and determining whether subscriber terminal is the positive subscriber terminal.

* * * * *